May 14, 1968 W. B. MAYFIELD 3,383,084
PULSE-ACTUATED VALVE
Original Filed April 20, 1964 2 Sheets-Sheet 1
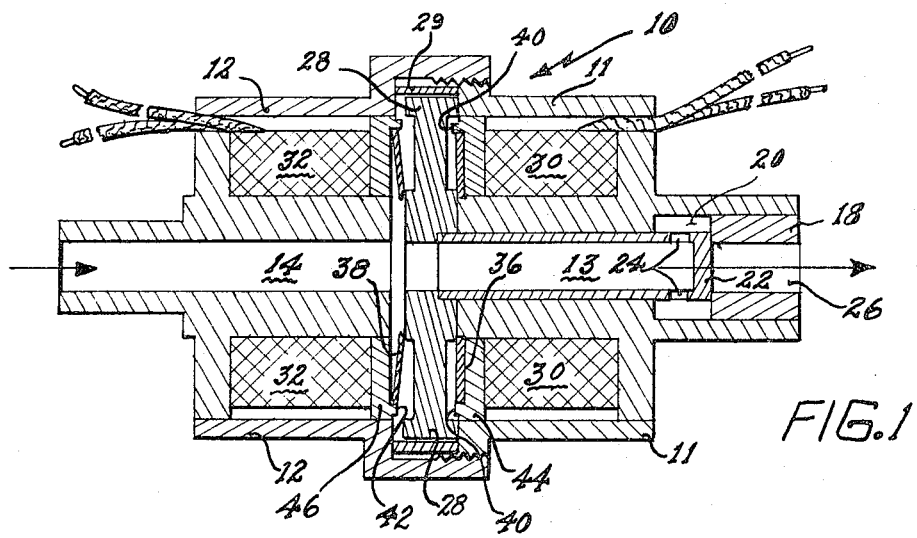
FIG.1
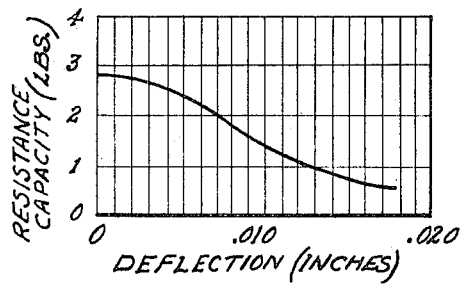
FIG.2-A
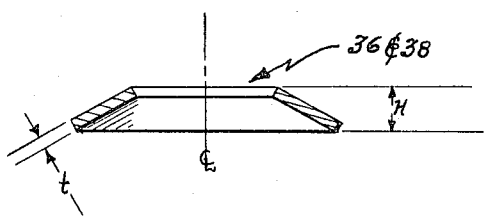
FIG.2-B
INVENTOR.
WILLIAM B. MAYFIELD
BY
ATTORNEYS

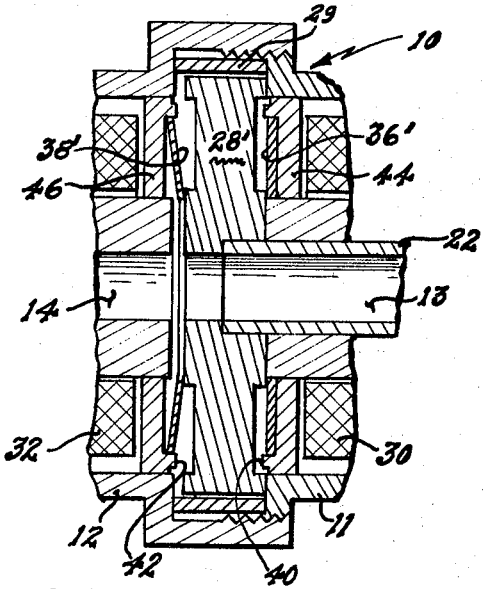
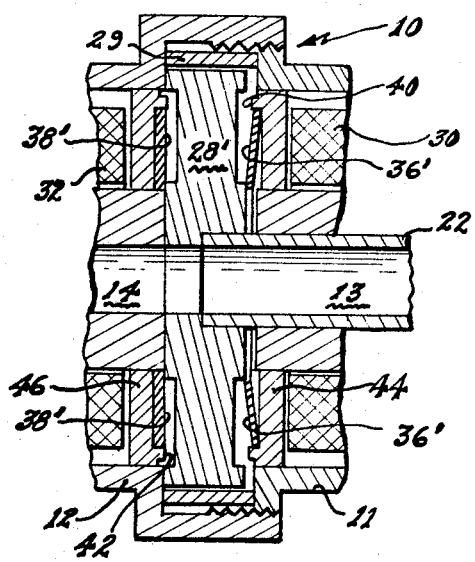
FIG. 3-A   FIG. 3-B
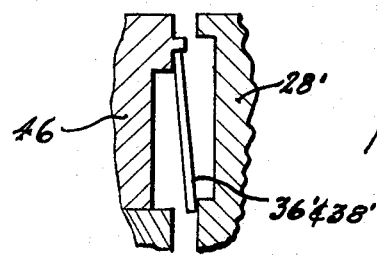
FIG. 4-A
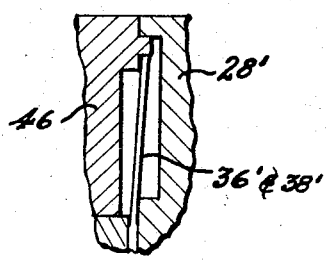
FIG. 4-B
INVENTOR.
WILLIAM B. MAYFIELD United States Patent Office 3,383,084
Patented May 14, 1968

3,383,084
PULSE-ACTUATED VALVE
William B. Mayfield, Sunland, Calif., assignor to the United States of America as represented by the Secretary of the Air Force
Continuation of application Ser. No. 361,633, Apr. 20, 1964. This application Dec. 12, 1966, Ser. No. 621,082
1 Claim. (Cl. 251—75)

ABSTRACT OF THE DISCLOSURE

Opposed Belleville washers are mounted on opposite sides of an armature to which a valve stem is connected. In completely open valve position one washer carries maximum load and the opposed washer carries minimum load. As the valve closes the loadings are reversed.

This is a continuation of application Ser. No. 361,633 filed Apr. 20, 1964, and now abandoned.

The invention relates to a pulse actuated, solenoid operated shut-off valve, and more particularly to a valve whose position is governed by a pair of opposed solenoids and a flat armature which is rigidly secured to a valve stem and is capable of movement only in response to an impulse from either solenoid.

The objects of the invention are the provision of a device incorporating the principle noted, and wherein means, in the present exemplification a pair of Belleville washers, are provided for holding the armature in the position selected when the current is removed from the inciting solenoid. The position can only be changed by actuating the opposite solenoid.

A further object of the invention is the design of a device wherein maximum and minimum loads and gradations of these loads are imposed on an armature by oppositely positioned Belleville washers under stress, one washer having maximum load in completely open position of the valve while the opposed washer carries minimum load. As the valve closes, the loadings are reversed. It is conceivable that valve positions between fully open and fully closed could be maintained by unequal loadings on the opposed washers whose value lies between maximum and minimum.

These and other advantages, features and objects of the invention will become more apparent from the following description taken in connection with the illustrative embodiments in the accompanying drawings wherein:

FIG. 1 is a cross-sectional view through the valve and showing the solenoid operating means;

FIG. 2A shows a typical load versus deflection curve for a Belleville washer having a ratio $H/t$ equal to 2.6;

FIG. 2B is the representation of a Belleville washer where H represents the height of the washer and $t$ its thickness;

FIG. 3A and 3B represent respectively the "closed" and "open" position of the valve wherein the spring loads and directions of forces are demonstrated; and FIGS. 4A and 4B are the "open" and "closed" positions, respectively, of a valve design with a flat Belleville washer and a flat faced armature which contemplates short strokes and relatively high rates.

A valve casing is indicated generally by the numeral 10. The casing in the example shown in FIG. 1 is comprised of a pair of threadedly connected sections 11 and 12 having communicating axial bores 13 and 14. A member 18 is fitted into a counter bore 20 in the casing section 11 in such a way that a valve seat and a flow chamber 26 are formed for a hollow poppet valve 22. Flow openings 24 communicate with the flow chamber 26. The hollow poppet valve head 22 is rigidly mounted on an armature 28 and moves therewith, sliding to and fro in the bore 13. An opening solenoid 30 and a closing solenoid 32 are placed in radially located recesses provided therefor in the casing sections 11 and 12. These provide the impulse necessary to magnetize the armature 28 and move it in one direction or the other, depending upon which of the solenoids 30 and 32 are energized to provide the impulse.

The armature 28 is located in an enlarged recess in the casing 10 and is capable of reciprocal movement therein. Its movement is governed, as stated, by energizing either of the solenoid coils 30 and 32, and it is held stationary in the position it holds at the instant the impulse is removed. A bushing 29 provides support for the armature.

A pair of Belleville washers 36 and 38 are located on opposite sides of the armature 28. As is well known, a Belleville washer is a conically shaped resilient element, capable of compression and, when compressed, offers an opposing force resisting deformation. Each of the washers 36 and 38 seats at its inner circumferential area on a face of the flat armature element 28. Their outer circumferential edges are seated in shoulders 40 and 42 respectively of the retaining elements 44 and 46.

It will be seen that the washers 36 and 38 exert pressures ranging from maximum to minimum, depending upon the position in which the armature is at rest.

On FIG. 2A, the vertical coordinate indicates the amount of resisting force which the washer is capable of exerting under varying degrees of deflection. The greater the deflection, the less resistance force it is able to exert. As the armature moves in one direction, the deflection on one washer increases, and its capability of resisting the deflecting movement decreases, the opposite washer is being affected oppositely. At all times, resultant or combined force of the two washers remains of a dimension incapable in itself of moving the armature, but sufficient to counteract the momentum of the armature 28, and hold it at rest at the end of the stroke. Any movement of the armature is accomplished only by current applied to the solenoid.

In the following example of operation given, specific values are given in pounds to the forces exerted at any given moment by each washer. These values are by way of example only, and may be varied as expedient and desirable without departing from the spirit and scope of the invention.

Referring to FIGS. 3A and 3B, the operating cycle is as follows:

Assuming the unit is in the closed position and pressure is applied to the inlet port, there is no flow through the valve and the poppet 22 is loaded in the closed position by the force of the "closed" Belleville washer 38 which is 2.8 lbs. minus the force of the "open" Belleville washer 36 which is .5 lb. plus the unbalance force which is 5 lbs. at 100 p.s.i. Therefore the force holding the valve in the closed position at 100 p.s.i. is 7.3 lbs. The opening solenoid 32 upon energizing, must produce an initial load greater than 7.3 lbs.

As the armature moves from the closed to the open position the two Belleville washers reverse their loads. The "close" position Belleville 38 reduces its load from 2.8 lbs. to .5 lb. while the "open" position Belleville washer 36 increases its load from .5 to 2.8 lbs., resulting in a net load of 2.3 lbs. holding the valve 22 open. This assumes that the pressure drop through the poppet 22 is negligible.

To close the valve 22, the closing solenoid 30 must produce a force greater than 2.3 lbs. upon energizing.

The negative rate characteristic is obtained by employing a free height ("H") to washer thickness ("$t$") ratio greater than 1.4. At some deflection point beyond 50% of the free height the load, that is, the capability of the washer to exert force to oppose deflection, will decrease and at some point become negative. FIG. 2A shows a typical load vs. deflection curve for a Belleville washer having a $H/t$ ratio of 2.6. Such a washer is shown in FIG. 2B.

Applying this to the valve, the spring loads and direction of forces are as shown in FIGS. 3A and 3B.

It should be pointed out that the use of commercial manufacturing tolerances on the Belleville washers can be accepted because of the close control of the installed position and maximum deflection position. As can be seen, the installed position (max. height) is the stroke minus the Belleville thickness and the maximum over center position is equal to the thickness of the Belleville washer.

Where the valve is designed for short strokes and relatively high stroke rate, flatter washers 36' and 38' having a smaller H value with reference to thickness are used with a flat faced armature, as is shown at 28' in FIGS. 4A and 4B.

As can be seen on FIG. 1, the effective armature area on the opening solenoid is larger than that on the closing solenoid. This is due to the poppet running through the closing solenoid bobbin. This in turn will produce a greater force in the opening direction. Pressure produces a force holding the poppet on seat, requiring a greater force to open the unit, which coincides with the solenoid forces.

Although the invention has been described with reference to particular embodiments, it will be understood to those skilled in the art that the invention is capable of a variety of alternative embodiments within the spirit and scope of the appended claim.

What I claim is:

1. In a pulse actuated valve, a valve seat and a valve head, means for moving said valve head to seat and unseat said valve, said means comprising an armature attached to said valve head and movable by solenoid provided impulses, and means for maintaining said armature and valve head immovable upon the removal of said impulses until such time as an impulse is again applied, said means comprising a pair of opposed Belleville washers placed one on either side of said armature, one of said washers being compressed and deformed to reduce its ability to resist deformation by the movement of said armature in one direction while the opposed washer is being released and its ability to resist deforming force is being increased.

References Cited

UNITED STATES PATENTS

| | | | |
|---|---|---|---|
| 2,435,817 | 2/1948 | Boynton et al. | 335—256 |
| 2,533,187 | 12/1950 | Cataldo et al. | 335—256 |
| 3,099,282 | 7/1963 | Miller et al. | 251—75 X |

FOREIGN PATENTS

| | | |
|---|---|---|
| 563,530 | 8/1944 | Great Britain. |

M. CARY NELSON, *Primary Examiner.*

A. ROSENTHAL, *Assistant Examiner.*